June 7, 1960

W. H. PEARSON 2,939,549

DUST CAP FOR GREASE FITTINGS

Filed Dec. 6, 1957

INVENTOR.
Wendell H. Pearson
BY Sam J. Slotsky
ATTORNEY

United States Patent Office 2,939,549
Patented June 7, 1960

---

2,939,549
DUST CAP FOR GREASE FITTINGS
Wendell H. Pearson, Rte. 2, Alcester, S. Dak.

Filed Dec. 6, 1957, Ser. No. 701,041

1 Claim. (Cl. 184—88)

My invention relates to a dust cap for grease fittings. An object of my invention is to provide a dust cap whihc need not be removed, since the dust cap will automatically open when a pressure grease fitting is applied, and will close itself in the reverse manner when the fitting is removed.

A further object of my invention is to provide a device of very simple construction.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

My invention relates to a dust cap which can be attached to a standard grease fitting and having certain resilient characteristics whereby the fitting can be filled and automatically re-closed without requiring removal of the cap.

I have used the character 10 to designate a standard grease fitting having the upper portion 11 including the sloping wall 12, the fitting communicating with any body portion 13 which is to be filled with grease.

Figure 3:
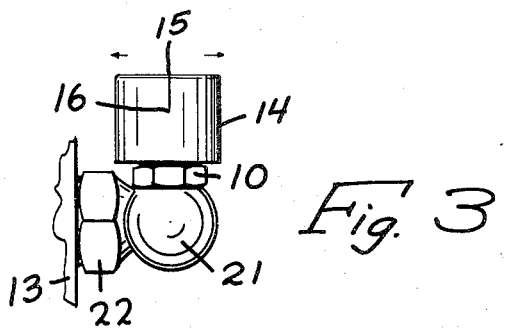
Figure 3 is a side elevation of my device as attached to an alternative form of grease fitting.

The device of my invention comprises a substantially cylindrical member 14 which is made of a resilient rubber preferably having good spring characteristics, and formed in this rubber member is a cut 15 which cut extends across the top of the member 14 and downwardly to the point 16 (as shown in Fig. 3), the side portions of the member 14 abutting snugly at the cut to thereby keep out the dust, moisture, etc.

I further provide a coiled helical spring 17 which can be molded within the body 14.

Figure 1:
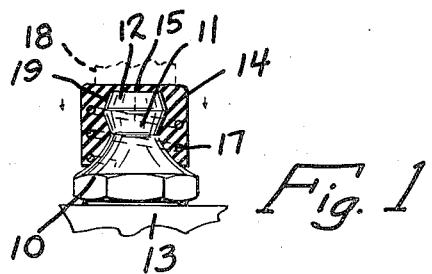
Figure 1 is a partially sectional view of a grease fitting with my device attached thereto.
Figure 2:
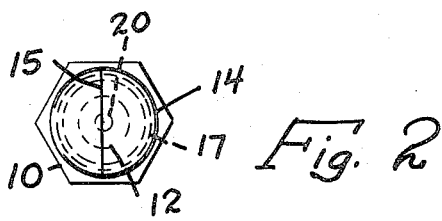
Figure 2 is a plan view of Figure 1.

The device operates in the following manner. When the pressure fitting which is to force the grease into the fitting 10 is applied, it is forced downwardly against the top of the member 14, the character 18 is Figure 1 illustrating by dotted lines this fitting. As the pressure is applied downwardly, the tendency will be for the sloping wall 19 of the resilient member 14 to spread the upper portions of the member 14 apart since the cut 15 will permit the top portion to open freely and since the sloping wall 12 will cause the spreading action, so that the pressure fitting 10 can be filled through the usual opening 20 (see Fig. 2).

As soon as the fitting 18 is removed, the spring 17 will exert an upward pressure, which together with the resilient characteristic of the member 14 will cause the cut portions to re-close thereby resealing the opening against dust, etc.

The spring 17 assists in the resilient action in the manner above stated and is compressed during the filling operation.

It should be understood that other slight modifications could be made in the inside configuration of the member 14 without departing from the essential spirit of my invention.

Figure 3 illustrates a further form wherein the same type of fitting 14 is applied to an angle type of pressure fitting having a ball portion 21 and portion 22, the upper portion, or the portion enclosed by the member 14 being substantially identical to that shown in Figure 1.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A dust cap for grease fittings comprising a substantially cylindrical resilient body including an upper end wall and an inner sloping wall conforming generally to the upper portion of said grease fitting, said body having a transverse slit through said upper end wall whereby the upper portion of said body will spread apart upon the pressure of a grease applying fitting thereon, a coiled helical spring positioned within said body to assist in the resilient action thereof.

References Cited in the file of this patent
UNITED STATES PATENTS

| | | |
|---|---|---|
| 2,379,529 | Kennedy | July 3, 1945 |
| 2,588,171 | Smith et al. | Mar. 4, 1952 |
| 2,594,040 | Le Clair | Apr. 22, 1952 |